United States Patent
Myung et al.

(10) Patent No.: US 12,452,867 B2
(45) Date of Patent: Oct. 21, 2025

(54) METHOD OF TRANSMITTING AND RECEIVING UPLINK CONTROL CHANNEL AND APPARATUS THEREFOR

(71) Applicant: LG ELECTRONICS INC., Seoul (KR)

(72) Inventors: Sechang Myung, Seoul (KR); Suckchel Yang, Seoul (KR); Seonwook Kim, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 484 days.

(21) Appl. No.: 17/935,355

(22) Filed: Sep. 26, 2022

(65) Prior Publication Data
US 2023/0096323 A1  Mar. 30, 2023

(30) Foreign Application Priority Data

Sep. 30, 2021 (KR) .......... 10-2021-0130361
Oct. 29, 2021 (KR) .......... 10-2021-0147264

(51) Int. Cl.
*H04W 72/21* (2023.01)
*H04L 5/00* (2006.01)
*H04W 72/044* (2023.01)

(52) U.S. Cl.
CPC .......... *H04W 72/21* (2023.01); *H04L 5/0053* (2013.01); *H04W 72/044* (2013.01)

(58) Field of Classification Search
CPC .. H04W 72/21; H04W 72/044; H04L 5/0053; H04L 5/0044; H04L 5/0005
See application file for complete search history.

(56) References Cited

U.S. PATENT DOCUMENTS

2019/0349964 A1* 11/2019 Liou .......... H04B 7/0626
2022/0408428 A1* 12/2022 Tian .......... H04B 1/7143

* cited by examiner

*Primary Examiner* — Basil Ma
(74) *Attorney, Agent, or Firm* — LEE, HONG, DEGERMAN, KANG & WAIMEY

(57) ABSTRACT

A method of transmitting a PUCCH by a UE in a wireless communication system is provided. The method includes receiving (i) first information related to an uplink (UL) bandwidth part (BWP), (ii) second information related to the number of resource blocks (RBs) for the PUCCH, and (iii) third information related to an index of one initial PUCCH resource set among a plurality of initial PUCCH resource sets, determining whether the one initial PUCCH resource set is valid based on at least of the size of the UL BWP and the number of the RBs, and transmitting the PUCCH through a PUCCH resource included in the one initial PUCCH resource set based on the one initial PUCCH resource set being valid.

9 Claims, 16 Drawing Sheets

(a) Carrier aggregation between L-band and U-band (b) Standalone U-band(s)

RB assignment information for PUSCH: {Interlace #2, RB set #1} => Intersection of Interlace # and RB set #1

(a) Case 1: one SB index is indicated via RA information for PUSCH

RB assignment information for PUSCH: {Interlace #2, RB sets #1/#2} =>
=> Intersection of Interlace # and RB set #1/GB #2/RB set #1

(a) Case 2: consecutive SB index is indicated via RA information for PUSCH

FIG. 9

| Initial CS index | 0 | 4 | 8 | →hopping→ | 0 | 4 | 8 |
|---|---|---|---|---|---|---|---|
| High Frequency RB | 8 | 9 | 10 | | 0 | 1 | 2 |
| | 11 | 12 | 13 | | 3 | 4 | 5 |
| | 14 | 15 | | | 6 | 7 | |
| ⋮ | ⋮ | | | | ⋮ | | |
| | 6 | 7 | | | 14 | 15 | |
| | 3 | 4 | 5 | | 11 | 12 | 13 |
| Low frequency RB | 0 | 1 | 2 | | 8 | 9 | 10 |

METHOD OF TRANSMITTING AND RECEIVING UPLINK CONTROL CHANNEL AND APPARATUS THEREFOR

CROSS-REFERENCE TO RELATED APPLICATION(S)

Pursuant to 35 U.S.C. § 119(a), this application claims the benefit of earlier filing date and right of priority to Korean Patent Application Nos. 10-2021-0130361, filed on Sep. 30, 2021, and 10-2021-0147264, filed on Oct. 29, 2021, the contents of which are all hereby incorporated by reference herein in their entireties.

BACKGROUND OF THE DISCLOSURE

Field of the Disclosure

The present disclosure relates to a method of transmitting and receiving an uplink control channel and an apparatus therefor. More particularly, the present disclosure relates to a method of determining a physical uplink control channel (PUCCH) resource upon using a plurality of physical resource blocks (PRBs) for the PUCCH resource according to an initial PUCCH resource set and an apparatus therefor.

Discussion of the Related Art

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving an uplink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a method of transmitting a physical uplink control channel (PUCCH) by a user equipment (UE) in a wireless communication system includes receiving (i) first information related to an uplink (UL) bandwidth part (BWP), (ii) second information related to the number of resource blocks (RBs) for the PUCCH, and (iii) third information related to an index of one initial PUCCH resource set among a plurality of initial PUCCH resource sets, determining whether the one initial PUCCH resource set is valid based on at least of the size of the UL BWP and the number of the RBs, and transmitting the PUCCH through a PUCCH resource included in the one initial PUCCH resource set based on the one initial PUCCH resource set being valid.

The index of the one initial PUCCH resource set may be 15.

The one initial PUCCH resource set may be valid based on the number of RBs being equal to or less than a specific value.

The specific value may be proportional to the size of the UL BWP.

The one initial PUCCH resource set may be valid based on the size of the UL BWP being equal to or greater than a specific value.

The specific value may be proportional to the number of the RBs.

In another aspect of the present disclosure, a user equipment (UE) for transmitting a physical uplink control channel (PUCCH) in a wireless communication system includes at least one transceiver, at least one processor, and at least one memory operably connected to the at least one processor and configured to store instructions causing, when executed, the at least one processor to perform operations. The operations may include receiving, through the at least one transceiver, (i) first information related to an uplink (UL) bandwidth part (BWP), (ii) second information related to the number of resource blocks (RBs) for the PUCCH, and (iii) third information related to an index of one initial PUCCH resource set among a plurality of initial PUCCH resource sets, determining whether the one initial PUCCH resource set is valid based on at least of the size of the UL BWP and the number of the RBs, and transmitting, through at least one transceiver, the PUCCH through a PUCCH resource included in the one initial PUCCH resource set based on the one initial PUCCH resource set being valid.

The index of the one initial PUCCH resource set may be 15.

The one initial PUCCH resource set may be valid based on the number of RBs being equal to or less than a specific value.

The specific value may be proportional to the size of the UL BWP.

The one initial PUCCH resource set may be valid based on the size of the UL BWP being equal to or greater than a specific value.

The specific value may be proportional to the number of the RBs.

In another aspect of the present disclosure, an apparatus for transmitting a physical uplink control channel (PUCCH) in a wireless communication system includes at least one processor, and at least one memory operably connected to the at least one processor and configured to store instructions causing, when executed, the at least one processor to perform operations. The operations may include receiving (i) first information related to an uplink (UL) bandwidth part (BWP), (ii) second information related to the number of resource blocks (RBs) for the PUCCH, and (iii) third information related to an index of one initial PUCCH resource set among a plurality of initial PUCCH resource sets, determining whether the one initial PUCCH resource set is valid based on at least of the size of the UL BWP and the number of the RBs, and transmitting the PUCCH through a PUCCH resource included in the one initial PUCCH resource set based on the one initial PUCCH resource set being valid.

According to [Proposed Method #1] of the present disclosure, even if indexes #1 to #14 of initial PUCCH resource sets are configured and different PRB values are configured for a plurality of UEs, PRBs used for PUCCH transmission by respective UEs may be prevented from overlapping or wasted PRBs may be prevented from occurring among PRBs used for PUCCH transmission by respective UEs.

According to [Proposed Method #2] to [Proposed Method #3] of the present disclosure, when index #15 of an initial PUCCH resource set is configured, PRBs used for PUCCH transmission by respective UEs may be prevented from overlapping or PRBs that are not suitable for the intention at the time of designing the initial PUCCH resource set of index #15 may be prevented from being allocated.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 9 is a diagram for explaining an example of allocating a PUCCH resource using frequency hopping in an initial PUCCH resource set;

DETAILED DESCRIPTION

Figure 1:
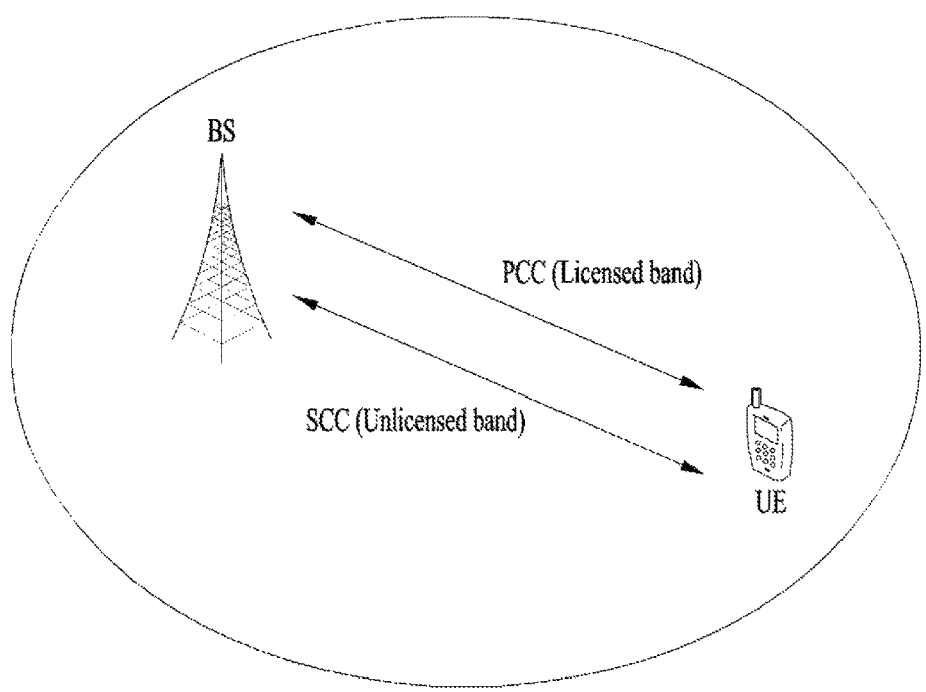
FIG. 1 illustrates a wireless communication system supporting an unlicensed band.
Figure 1:
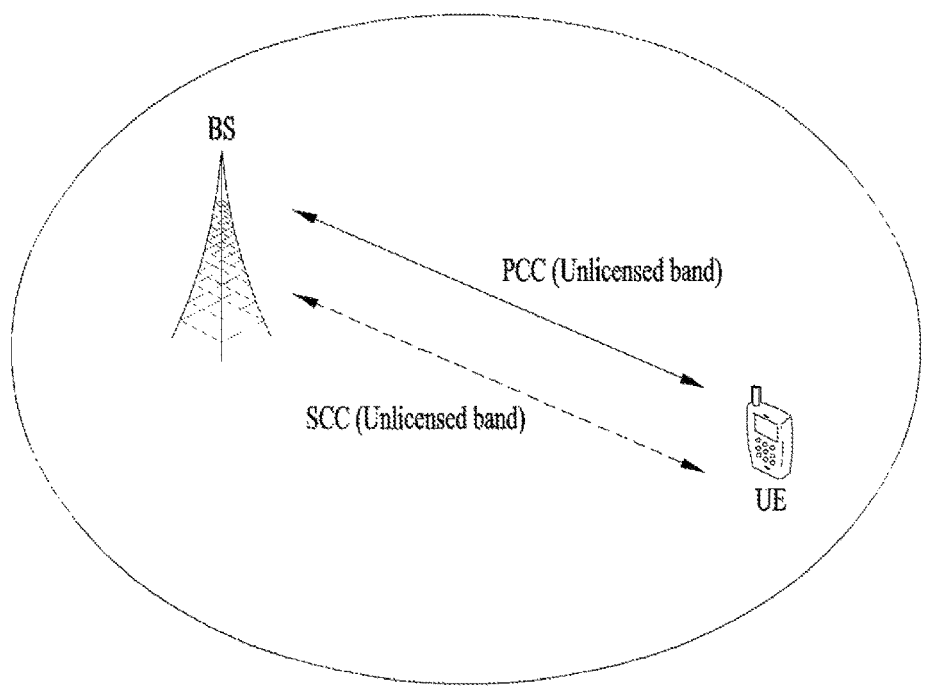

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TB s) or instructs that one or more TB s be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

FIG. 1 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in a U-band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 μs. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 μs, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff-based LBT (e.g., Cat-3 LBT or Cat-4 LBT) to the UE and the UE performs UL transmission using a remaining COT of the BS, when it is confirmed that a channel is idle by success of LBT after performing LBT without random backoff (e.g., Cat-1 LBT or Cat-2 LBT) using a timing gap occurring before UL transmission start from a DL transmission end timing of the BS.

DL transmission burst: a set of transmissions without any gap greater than 16 μs from the BS. Transmissions from the BS, which are separated by a gap exceeding 16 μs are considered as separate DL transmission bursts. The BS may perform transmission(s) after a gap without sensing channel availability within a DL transmission burst.

UL transmission burst: a set of transmissions without any gap greater than 16 μs from the UE. Transmissions from the UE, which are separated by a gap exceeding 16 μs are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 2:
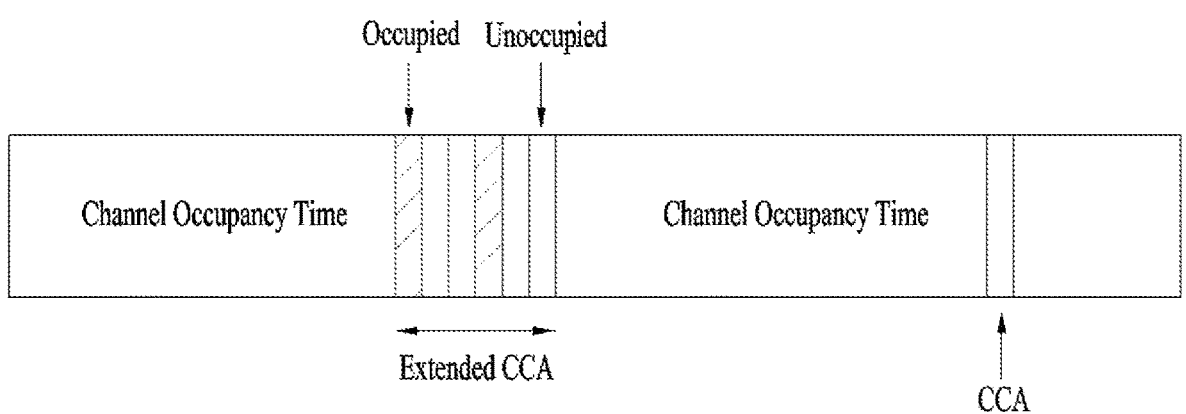
FIG. 2 illustrates an exemplary method of occupying resources in an unlicensed band.

FIG. 2 illustrates an exemplary method of occupying resources in a U-band.

Referring to FIG. 2, a communication node (e.g., a BS or a UE) operating in a U-band should determine whether other communication node(s) is using a channel, before signal transmission. For this purpose, the communication node may perform a CAP to access channel(s) on which transmission(s) is to be performed in the U-band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the U-band. CAP may be replaced with LBT.

Table 1 describes an exemplary CAP supported in NR-U.

TABLE 1

| | Type | Explanation |
|---|---|---|
| DL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

In a wireless communication system supporting a U-band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information.

A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in a U-band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 3:
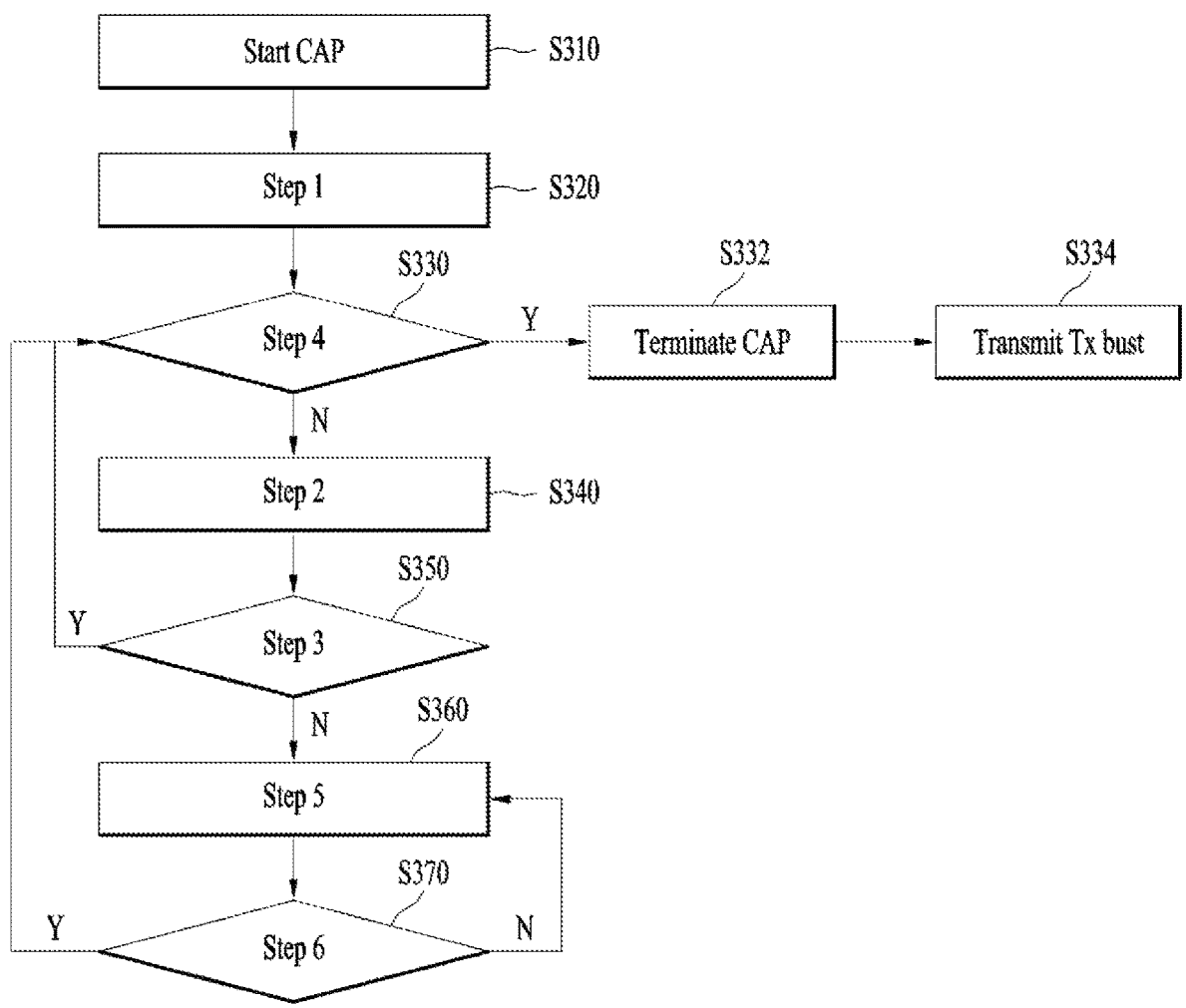
FIG. 3 illustrates an exemplary channel access procedure of a UE for UL signal transmission in an unlicensed band applicable to the present disclosure.

FIG. 3 illustrates Type 1 CAP among channel access procedures of a UE for UL signal transmission in a U-band applicable to the present disclosure.

First, UL signal transmission in the U-band will be described with reference to FIG. 3.

The UE may sense whether a channel is idle for a sensing slot duration in a defer duration Td. After a counter N is decremented to 0, the UE may perform a transmission (S334). The counter N is adjusted by sensing the channel for additional slot duration(s) according to the following procedure.

Step 1) Set N=Ninit where Ninit is a random number uniformly distributed between 0 and CWp, and go to step 4 (S320).

Step 2) If N>0 and the UE chooses to decrement the counter, set N=N−1 (S340).

Step 3) Sense the channel for an additional slot duration, and if the additional slot duration is idle (Y), go to step 4. Else (N), go to step 5 (S350).

Step 4) If N=0 (Y) (S330), stop CAP (S332). Else (N), go to step 2.

Step 5) Sense the channel until a busy sensing slot is detected within the additional defer duration Td or all slots of the additional defer duration Td are sensed as idle (S360).

Step 6) If the channel is sensed as idle for all slot durations of the additional defer duration Td (Y), go to step 4. Else (N), go to step 5 (S370).

Table 2 illustrates that mp, a minimum CW, a maximum CW, a maximum channel occupancy time (MCOT), and an allowed CW size applied to a CAP vary according to channel access priority classes.

TABLE 2

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Td includes a duration Tf (16 μs) immediately followed by mp consecutive slot durations where each slot duration Tsl is 9 μs, and Tf includes a sensing slot duration Tsl at the start of the 16-μs duration.

CWmin,p<=CWp<=CWmax,p. CWp is set to CWmin, p, and may be updated before Step 1 based on an explicit/ implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 μs). Tshort_dl includes a duration Tf (=16 μs) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 μs). In the Type 2B UL CAP, Tf includes a sensing slot within the last 9 μs of the duration. In the Type 2C UL CAP, the UE does not sense a channel before a transmission.

To allow the UE to transmit UL data in the U-band, the BS should succeed in an LBT operation to transmit a UL grant in the U-band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the U-band during the time period may defer the scheduled UL data transmission of the UE. In this context, a method of increasing the efficiency of UL data transmission in the U-band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

Figure 4:
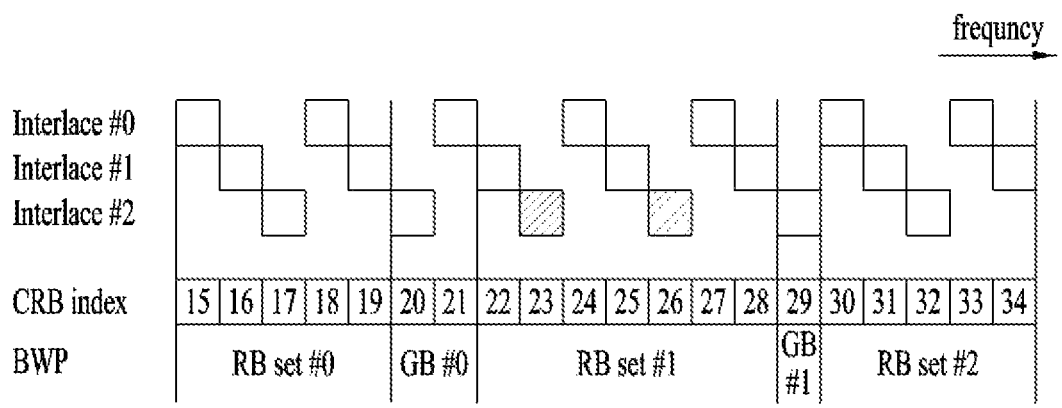
FIG. 4 is a diagram for explaining a resource allocation method for UL transmission in a shared spectrum applicable to the present disclosure.
Figure 4:
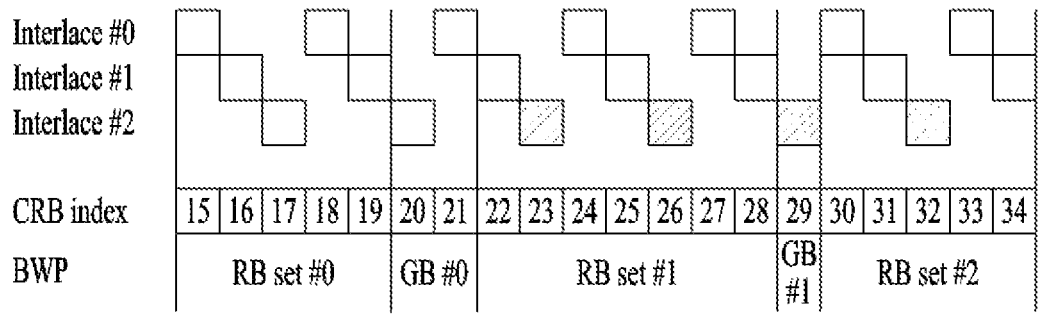

FIG. 4 illustrates resource assignment for UL transmission in a shared spectrum.

Referring to FIG. 4(a), RBs belonging to interlace #1 in RB set #1 may be determined as a PUSCH resource based on resource assignment information for a PUSCH indicating {interlace #1, RB set #1}. That is, RBs corresponding to the intersection of {interlace #1, RB set #1} may be determined as the PUSCH resource. Referring to FIG. 4(b), RBs belonging to interlace #2 in RB sets #1 and #2 may be determined as the PUSCH resource based on the resource assignment information for the PUSCH indicating {interlace #2, RB sets #1 and #2}. In this case, a guide band (GB) (i.e., GB #1) between RB set #1 and RB set #2 may also be used as the PUSCH transmission resource. That is, RBs corresponding to the intersection of {interlace #1, RB sets #1 and #2, GB #1} may be determined as the PUSCH resource. In this case, a GB (i.e., GB #0) which is not between RB set #1 and RB set #2 is not used as the PUSCH transmission resource even if the GB is adjacent to RB sets #1 and #2.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 3 illustrates exemplary PUCCH formats. PUCCH formats may be divided into short PUCCHs (Formats 0 and 2) and long PUCCHs (Formats 1, 3, and 4) based on PUCCH transmission durations.

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

Figure 5:
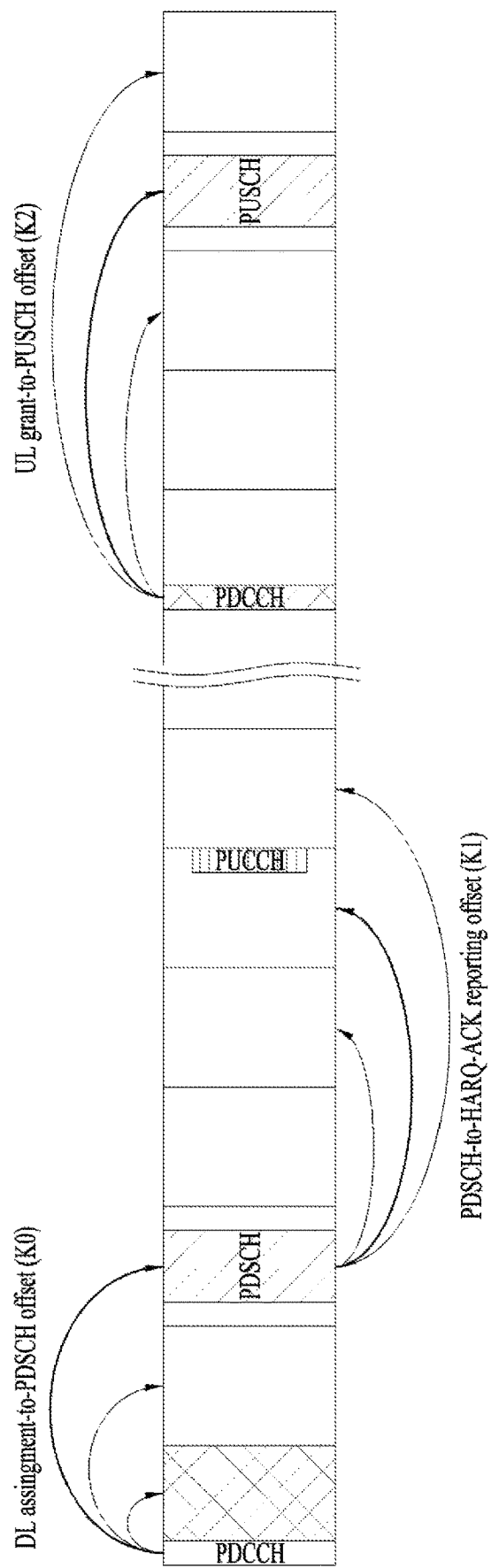
FIG. 5 illustrates a physical uplink control channel (PUCCH) and physical uplink shared channel (PUSCH) transmission process.

FIG. 5 is a diagram for explaining a HARQ transmission timing, and a PUSCH transmission timing and assignment method.

HARQ-ACK is information indicating whether the UE has successfully received a physical DL channel. Upon successfully receiving the physical DL channel, the UE feeds back ACK to the BS and, otherwise, the UE feeds back NACK to the BS. In NR, HARQ supports 1-bit HARQ-ACK feedback per transport block. FIG. 5 illustrates an example of a HARQ-ACK timing K1.

In FIG. 5, K0 represents the number of slots from a slot with a PDCCH carrying DL assignment (i.e., DL grant) to a slot with corresponding PDSCH transmission, K1 represents the number of slots from a slot with a PDSCH to a slot with corresponding HARQ-ACK transmission, and K2 represents the number of slots from a slot with a PDCCH carrying a UL grant to a slot with corresponding PUSCH transmission. That is, K0, K1, and K2 may be briefly summarized as listed Table 4 below.

TABLE 4

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The BS may provide a HARQ-ACK feedback timing to the UE dynamically by DCI or semi-statically by RRC signaling. The NR system supports different minimum HARQ processing times for UEs. A HARQ processing time includes delay between a DL data reception timing and a corresponding HARQ-ACK transmission timing and delay between a UL grant reception timing and a corresponding UL data transmission timing. The UE transmits information about the capability of a minimum HARQ processing time thereof to the BS. From the viewpoint of the UE, HARQ ACK/NACK feedback for a plurality of DL transmissions in the time domain may be transmitted in one UL data/control region. A timing between DL data reception and corresponding ACK is indicated by the DCI.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size of the TB. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

Referring to FIG. 5, the UE may detect a PDCCH in slot #n. The PDCCH includes DL scheduling information (e.g., DCI format 1_0 and/or DCI format 1_1). The PDCCH indicates a DL assignment-to-PDSCH offset K0 and a PDSCH-to-HARQ-ACK reporting offset K1. For example, DCI format 1_0 and DCI format 1_1 may include the following information.

Frequency domain resource assignment: indicates an RB resource assigned to a PDSCH (e.g. one or more (dis)continuous RBs)

Time domain resource assignment: Time domain resource assignment: indicates K0 and the starting position (e.g., OFDM symbol index) and length (e.g., the number of OFDM symbols) of a PDSCH in a slot.

PDSCH-to-HARQ_feedback timing indicator: indicates K1.

HARQ process number (4 bits): indicates a HARQ process identity (ID) for data (e.g., a PDSCH or a TB).

PUCCH resource indicator (PRI): indicates a PUCCH resource to be used for UCI transmission among a plurality of PUCCH resources in a PUCCH resource set.

Next, the UE may receive a PDSCH in slot #(n+K0) according to scheduling information of slot #n and then transmit UCI on a PUCCH in slot #(n+K1). The UCI includes a HARQ-ACK response to the PDSCH. In the case in which the PDSCH is configured to carry a maximum of one TB, the HARQ-ACK response may be configured in one bit. In the case in which the PDSCH is configured to carry up to two TBs, the HARQ-ACK response may be configured as two bits if spatial bundling is not configured and as one bit if spatial bundling is configured. When slot #(n+K1) is designated as a HARQ-ACK transmission timing for a plurality of PDSCHs, UCI transmitted in slot #(n+K1) includes HARQ-ACK responses to the plurality of PDSCHs.

Referring to FIG. 5, the UE may detect a PDCCH in slot #n. The PDCCH includes UL scheduling information (e.g., DCI format 0_0 and/or DCI format 0_1). DCI format 0_0 and DCI format 0_1 may include the following information.

Frequency domain resource assignment: indicates an RB set assigned to a PUSCH.

Time domain resource assignment: indicates a slot offset K2 and the starting position (e.g., symbol index) and length (e.g., the number of OFDM symbols) of a PUSCH in a slot. The starting symbol and length may be indicated by a start and length indicator value (SLIV) or may be indicated individually.

Thereafter, the UE may transmit the PUSCH in slot #(n+k2) according to the scheduling information of slot #n. Here, the PUSCH includes a UL-SCH TB.

PUCCH Resource Set

In order to transmit UCI through a PUCCH, the UE may receive a dedicated PUCCH resource configuration. This dedicated PUCCH resource configuration may include information about a PUCCH resource set. The information about the PUCCH resource set may include, for example, N PUCCH resources, a PUCCH format for each of the N PUCCH resources, a starting symbol, a PUCCH resource duration, a physical resource block (PRB) offset, and a cyclic shift (CS) set.

For example, the first PUCCH resource set of the dedicated PUCCH resource configuration may include a maximum of 32 PUCCH resources and the remaining PUCCH resource set of the dedicated PUCCH resource configuration may include a maximum of 8 PUCCH resources.

If an interlace is indicated to be used for PUCCH transmission, the UE may transmit a PUCCH using frequency hopping. If the interlace is not indicated to be used, the UE may transmit the PUCCH without frequency hopping.

Upon receiving downlink control information (DCI) scheduling a PDSCH and transmitting HARQ-ACK through the PUCCH as a response to the DCI, the UE may determine any one of 16 PUCCH resources included in the PUCCH resource set to transmit HARQ-ACK through the determined PUCCH resource. For example, the UE determines an index of a PUCCH resource, based on the number of control channel elements (CCEs) in a control resource set (CORE-SET) of a PDCCH including the DCI scheduling the PDSCH, an index of the first CCE of the PDCCH, and a value of a PUCCH resource indicator field included in the DCI scheduling the PDSCH. Then, the UE may transmit HARQ-ACK through a PUCCH resource corresponding to the determined index.

However, if the UE does not receive the dedicated PUCCH resource configuration (e.g., before the BS transmits the dedicated PUCCH resource configuration), the UE may acquire an index corresponding to any one of indexes in rows of Table 5 below from pucch-ResourceCommon.

TABLE 5

| Index | PUCCH format | First symbol | Number of symbols | PRB offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N_{BWP}^{size}/4]$ | {0, 3, 6, 9} |

The UE may determine an index of a PRB for PUCCH transmission, based on a PRB offset of the PUCCH resource set corresponding to the acquired index of the PUCCH resource set, the index of the PUCCH resource set, the number of initial CS indexes included in a set of initial CS indexes, and a BWP size.

The UE may transmit the PUCCH through a PUCCH resource according to a PUCCH format, a starting symbol, and a symbol duration which correspond to the determined index of the PRB and the index of the PUCCH resource set.

In a Rel-15 NR PUCCH, 5 PUCCH formats (PUCCH format 0/1/2/3/4) are defined for each purpose in consideration of payload size, coverage, and delay. In Rel-16 NR in unlicensed spectrum (NR-U), a new PUCCH resource allocation method based on an interlaced RB allocation method in the Rel-15 PUCCH formats is used to satisfy regulatory requirements of an unlicensed band such as occupied channel bandwidth (OCB) and power spectral density (PSD).

To support an NR system in a high-frequency licensed/unlicensed band of 52.6 GHz or higher in Rel-17, it is necessary to improve a PUCCH design and a PUCCH resource allocation method of legacy Rel-15/16. In particular, in an unlicensed band of 60 GHz, path-loss is very large. Therefore, it is important to secure sufficient coverage, and PUCCH enhancement considering regulatory requirements (e.g., power spectral density and maximum output power limit) defined in each country/region as well is needed.

The present disclosure proposes a PUCCH resource allocation method when PUCCH formats, which have conventionally been transmitted using a single resource block (RB), are transmitted using multiple RBs. Especially, the present disclosure proposes an initial PUCCH resource set configuration and resource allocation method used for initial access, a PRB offset configuration/determination method for inter-cell FDM, and a starting PRB index calculation method considering a scaled PRB offset.

Although PUCCH formats 0/1/4 in Rel-15 have been transmitted through one RB, transmission of PUCCH formats 0/1/4 using one or more RBs (i.e., multiple RBs) (hereinafter, enhanced PUCCH formats 0/1/4) within limitations of a maximum power spectral density (PSD) and a maximum output power allowed in regulations may be considered to obtain sufficient reliability in a high-frequency unlicensed band of 52 GHz or higher. The number of RBs required to achieve the maximum allowed output power based on the maximum PSD allowed in the regulations may be different according to each subcarrier spacing (SCS). In some cases, even if an output power does not reach the maximum allowed output power, it may be necessary to transmit a PUCCH using fewer RBs than the number of RBs needed to achieve the maximum allowed output power when considering the total number of available RBs in a BWP and multiplexing and scheduling with other signals/channels.

A table for an initial PUCCH resource set of NR is as listed in Table 5.

Referring to Table 5, in NR, when "Set of initial CS indexes" includes two elements (e.g., indexes 0, 3, 7, and 11), since PUCCH formats 0/1 are transmitted using a single PRB (i.e., since one PRB is one FDM resource), a total of 8 PRBs is needed.

When "Set of initial CS indexes" includes 3 elements (e.g., indexes 1 and 2), a total of 6 PRBs is needed. When "Set of initial CS indexes" includes 4 elements (e.g., indexes 4, 5, 6, 8, 9, 10, 12, 13, 14, and 15), a total of 4 PRBs is needed.

Indexes 1 and 2 of Table 5 consider FDM between two cells and indexes 4, 5, 6, 8, 9, 10, 12, 13, and 14 consider FDM between three cells. In Table 5, indexes 0, 3, 7, and 11 consider an extreme channel delay situation such as a cell-edge UE and index 15 considers a special cell deployment situation.

Specially, in indexes 1 and 2 of Table 5, since three PRBs are allocated for one PUCCH resource set, two cells may be multiplexed by FDM using PRB offset=3. In indexes 4, 5, 6, 8, 9, 10, 12, 13, and 14 of Table 5, since two PRBs are allocated for one PUCCH resource set, three cells may be multiplexed by FDM using PRB offset=2 or 4.

Accordingly, since Table 5 has been designed by targeting full FDM between two or three cells when PUCCH formats 0/1 of legacy Rel-15 are transmitted using one PRB, if the number of RBs to be used for PUCCH transmission in a band of 52.6 GHz is increased from 1 to $N_{RB}$ (>1), it is necessary to scale up a current PRB offset of 2/3/4 by $N_{RB}$, which is the number of RBs.

Here, $N_{RB}$, which is the number of RBs, to be used to transmit a PUCCH in each cell may be configured by a BS through a system information block (SIB). A PRB offset may be applied through scaling using $N_{RB}$. However, when different $N_{RB}$ values are used between adjacent cells, PRBs may be unnecessarily wasted.

For example, different $N_{RB}$ values may be configured between different cells. Then, wasted PRBs may occur without being allocated to any adjacent cell among PRBs multiplexed using FDM. Alternatively, different $N_{RB}$ values may be configured between different cells so that a situation in which at least some of PRBs multiplexed using FDM between adjacent cells overlap may occur.

In Table 5, in the case of indexes 0 to 14, a starting PRB index of each PUCCH resource in an initial PUCCH resource set is calculated based on a PRB offset scaled based on an $N_{RB}$ value. However, in the case of index 15, since the PRB offset has a fixed value based on the number of RBs of a BWP, the starting PRB index of each PUCCH resource needs to be calculated in consideration of both the $N_{RB}$ value and the PRB offset based on the number of RBs of the BWP.

Hereinafter, the present disclosure proposes a method of configuring a scaling value to be multiplied by a PRB offset in consideration of an $N_{RB}$ value for PUCCH transmission using a plurality of PRBs and of intercell FDM and a method of calculating a starting PRB index for a PUCCH resource of initial PUCCH resource index 15.

Figure 6:
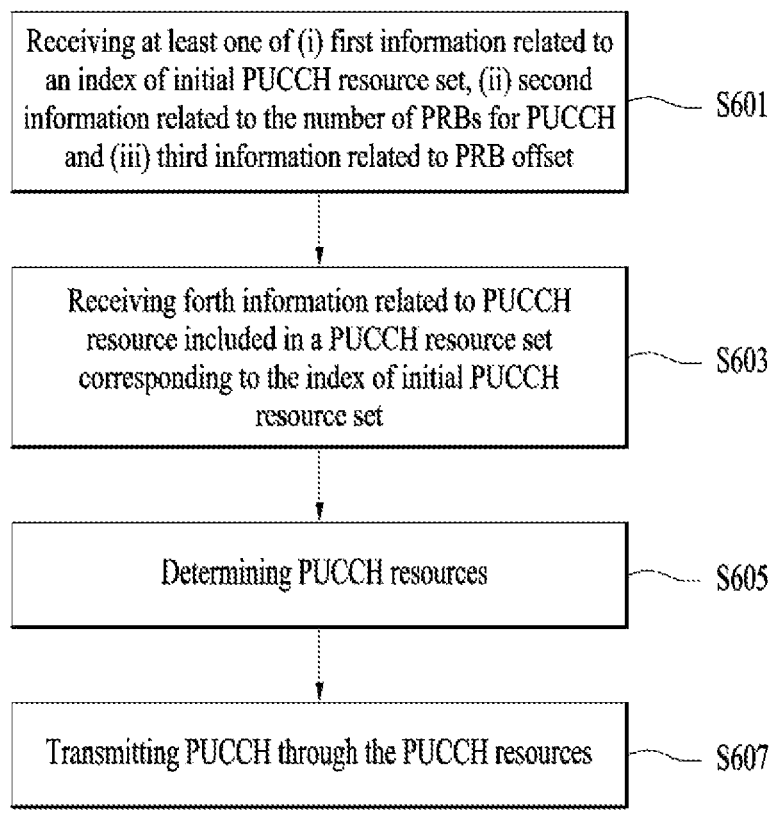
FIGS. 6, 7 and 8 are diagrams for explaining operation processes of a UE and a BS according to an embodiment of the present disclosure.
Figure 7:
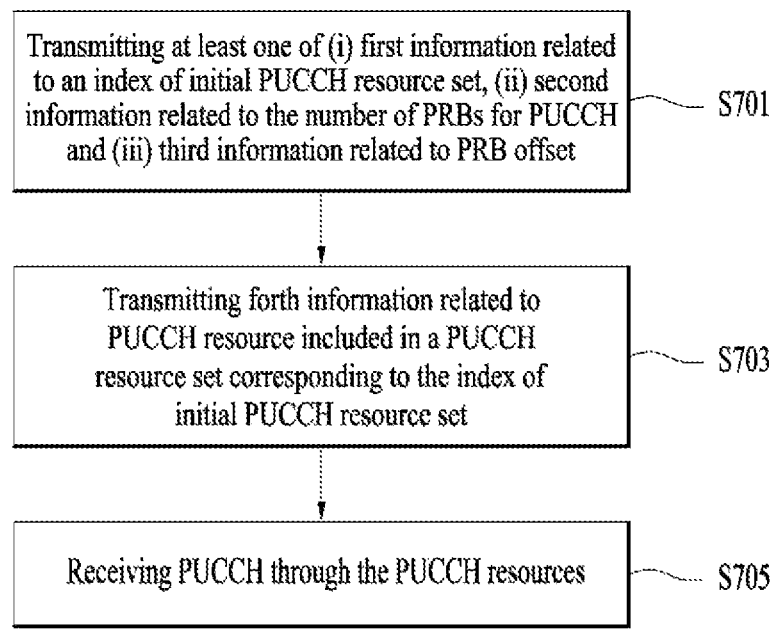
Figure 8:
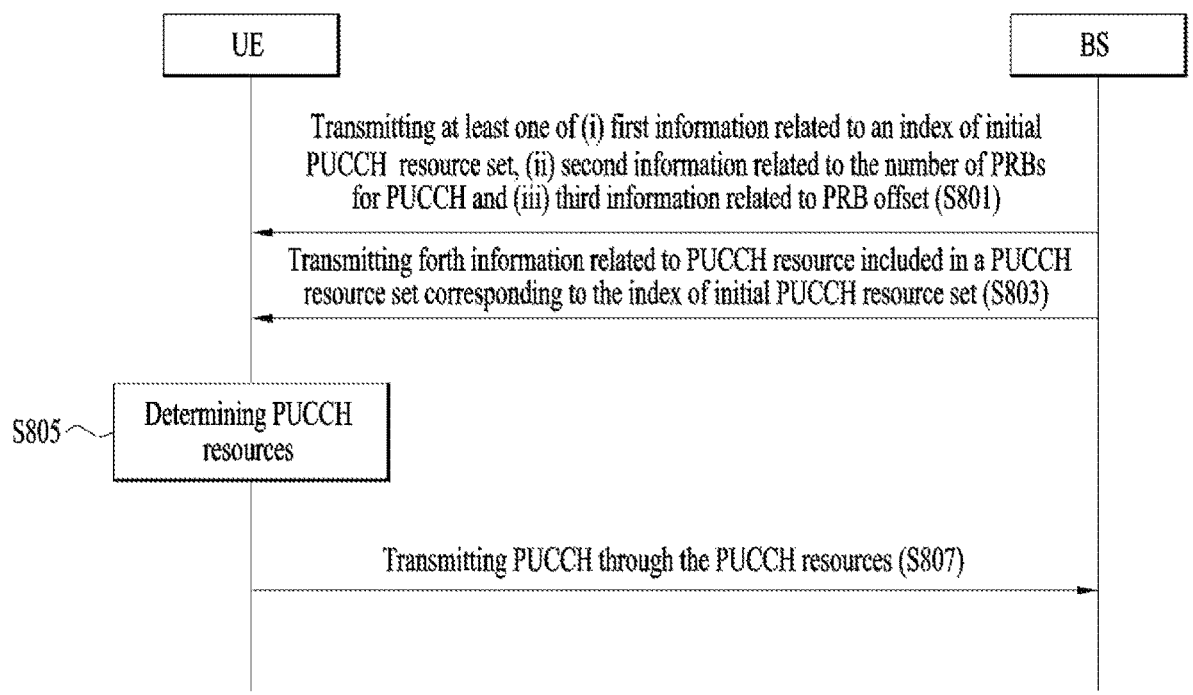

FIGS. 6 to 8 are diagrams for explaining overall operation processes of a UE and a BS according to proposed methods of the present disclosure.

FIG. 6 is a diagram for explaining the overall operation process of the UE according to the proposed methods of the present disclosure.

Referring to FIG. 6, the UE may receive at least one of first information related to an index of an initial PUCCH resource set, second information related to the number of PRBs for PUCCH transmission, and third information related to a PRB offset (S601). Which information among the first to third information is received may be based on at least one of [Proposed Method #1] to [Proposed Method #3]. For example, the first information and the second information may be necessarily received according to [Proposed Method #1] to [Proposed Method #3], and the third information may be received only when the PRB offset is scaled separately from the second information or a new PRB offset is configured, based on at least one of [Proposed Method #1] to [Proposed Method #3].

The first information to the third information may be received through a radio resource control (RRC) layer.

The UE may receive fourth information related to a PUCCH resource included in a PUCCH resource set corresponding to the first information (S603). For example, the fourth information may be information for determining an index of the PUCCH resource included in the corresponding PUCCH resource set and may be received through DCI.

The UE may determine a PUCCH resource for PUCCH transmission based on the first to fourth information (S605). The UE may transmit a PUCCH through the determined PUCCH resource (S607). The UE may determine the PUCCH resource and transmit the PUCCH based on at least one of [Proposed Method #1] to [Proposed Method #3].

FIG. 7 is a diagram for explaining the overall operation process of the BS according to the proposed methods of the present disclosure.

Referring to FIG. 7, the BS may transmit at least one of first information related to an index of an initial PUCCH resource set, second information related to the number of PRBs for PUCCH transmission, and third information related to a PRB offset (S701). Which information among the first to third information is transmitted may be based on at least one of [Proposed Method #1] to [Proposed Method #3]. For example, the first information and the second information may be necessarily transmitted according to [Proposed Method #1] to [Proposed Method #3], and the third information may be transmitted only when the PRB offset is scaled separately from the second information or a new PRB offset is configured, based on at least one of [Proposed Method #1] to [Proposed Method #3].

The first to third information may be transmitted through an RRC layer.

The BS may transmit fourth information related to a PUCCH resource included in a PUCCH resource set corresponding to the first information (S703). For example, the fourth information may be information for determining an index of the PUCCH resource included in the corresponding PUCCH resource set and may be transmitted through DCI.

The BS may receive a PUCCH through a PUCCH resource determined based on the first information to fourth information (S705). The BS may receive the PUCCH based on at least one of [Proposed Method #1] to [Proposed Method #3].

FIG. 8 is a diagram for explaining an overall operation process of a network according to the proposed methods of the present disclosure.

Referring to FIG. 8, the BS may transmit at least one of first information related to an index of an initial PUCCH resource set, second information related to the number of PRBs for PUCCH transmission, and third information related to a PRB offset to the UE (S801). Which information among the first to third information is transmitted may be based on at least one of [Proposed Method #1] to [Proposed Method #3]. For example, the first information and the second information may be necessarily transmitted according to [Proposed Method #1] to [Proposed Method #3], and the third information may be transmitted only when the PRB offset is scaled separately from the second information or a new PRB offset is configured, based on at least one of [Proposed Method #1] to [Proposed Method #3].

The first to third information may be transmitted through an RRC layer.

The BS may transmit fourth information related to a PUCCH resource included in a PUCCH resource set corresponding to the first information to the UE (S803). For example, the fourth information may be information for determining an index of the PUCCH resource included in the corresponding PUCCH resource set and may be transmitted through DCI.

The UE may determine a PUCCH resource for PUCCH transmission based on the first to fourth information (S805). The UE may transmit a PUCCH through the PUCCH resource to the BS (S807). The UE may determine the PUCCH resource and transmit the PUCCH based on at least one of [Proposed Method #1] to [Proposed Method #3].

[Proposed Method #1] Method of configuring, through an SIB, a PRB offset or a scaling value to be multiplied by the PRB offset in consideration of an $N_{RB}$ value of each cell and FDM between adjacent cells, when the BS configures an $N_{RB}$ value for PUCCH transmission for the UE through the SIB.

Before the UE receives a dedicated PUCCH resource configuration, one initial PUCCH resource set of the 16 initial PUCCH resource sets defined in Table 5 and $N_{RB}$, which is the number of PRBs of PUCCH resources included in the corresponding initial PUCCH resource set, may be configured for the UE through pucch-ResourceCommon (Integers (0 . . . 15)) of SIB1. As described above, the PRB offsets defined in Table 5 serve to allocate PRBs to be used for PUCCH transmission in consideration of intercell FDM based on PUCCH formats 0/1 being transmitted in a single PRB.

For example, a plurality of UEs may perform PUCCH transmission on the same time resource and on the same frequency resource using as many different initial cyclic shift (CS) values as the number of initial CS indexes defined for respective indexes in Table 5. For example, in an example of FIG. 9, if the number of initial CS indexes is 3, 16 PUCCH resources may be allocated through a maximum of 6 PRBs.

In FIG. 9, each of numbers 0 to 15 in rows corresponding to RBs from a high frequency RB to a low frequency RB may mean $r_{PUCCH}$, which is an index of a PUCCH resource included in one initial PUCCH resource set. For PUCCH resources from numbers 0 to 7, frequency hopping may be applied in a direction of the high frequency PRB from a direction of the low frequency PRB. For PUCCH resources of numbers 8 to 15, frequency hopping may be applied in the direction of the low frequency PRB from the direction of the high frequency PRB.

The example of FIG. 9 may correspond to indexes 1 and 2 in which the number of initial CS indexes is 3 among the 16 initial PUCCH resource sets of Table 5. If a PUCCH is transmitted in a single PRB as in legacy transmission, a cell using index 1 uses three PRBs starting from the low frequency PRB and three PRBs starting from the high frequency PRB in a BWP as PUCCH resources. Therefore, in order to allocate PUCCH resources through FDM without overlap, a cell using index 2 which is adjacent to the cell using index 1 may skip the three PRBs in a center direction of the BWP from the low frequency PRB and the high frequency PRB, which have been used by the cell using index 1 and then use the next PRBs starting from the fourth PRB from the low frequency PRB and the high frequency PRB as the PUCCH resources. This means the PRB offset $RB_{BWP}^{offset}$ defined in Table 5. If multiple PRBs (multiple RBs) are used instead of a single PRB for PUCCH transmission in a band of 60 GHz, since the number of PRBs for PUCCH resources is increased to $N_{RB}$, a PRB offset needs to be scaled by $N_{RB}$.

However, cells use different $N_{RB}$ values. If the PRB offset is scaled using an $N_{RB}$ value, some PRB resources may be wasted without being used. For example, if Cell #1 configures index #1 of an initial PUCCH resource set and an $N_{RB}$ value of 6 through an SIB and Cell #2 configures index #2 of the initial PUCCH resource set and an $N_{RB}$ value of 8 through the SIB, a PRB offset of Cell #2 is 24 (=8*3) and Cell #2 uses, as the PUCCH resources, PRBs starting from the 25th PRB in a center direction from the low frequency PRB and the high frequency PRB. However, since Cell #1 uses only 18 (=6*3) PRBs in the center direction from the low frequency PRB and the high frequency PRB in the BWP, 6 PRBs may be wasted without being used among the PUCCH resources of Cell #1 and the PUCCH resources of Cell #2. In this case, scaling the PRB offset of Cell #2 based on 6 RBs rather than 8 RBs may be an efficient FDM method.

As another example, the case in which the $N_{RB}$ values of Cell #1 and Cell #2 are exchanged with each other may be considered. That is, when the $N_{RB}$ value of Cell #1 is 8 and the $N_{RB}$ value of Cell #2 is 6, if the PRB offset of Cell #2 is scaled based on 6 RBs, RBs of the PUCCH resources used by the two cells may overlap. For example, if the $N_{RB}$ value of Cell #1 is 8, Cell #1 uses 24 (=8*3) PRBs in the center direction from the low frequency PRB and the high frequency PRB. Since the $N_{RB}$ value of Cell #2 is 6, the PRB offset of Cell #2 is 18 (=6*3) and Cell #2 may use PRBs starting from the 19th PRB in the center direction from the low frequency PRB and the high frequency PRB as the PUCCH resources. Therefore, PRBs from the 19th PRB to the 24th PRB may overlap as the PUCCH resources of Cell #1 and the PUCCH resources of Cell #2. Therefore, it may be efficient to scale the PRB offset of Cell #2 based on 8 RBs.

Therefore, separately from the $N_{RB}$ value, which is the number of RBs to be used for PUCCH transmission of each cell, if a scaling value to be multiplied by the PRB offset is configured for each cell through the SIB, FDM between adjacent cells may be efficiently performed.

Alternatively, a PRB offset to be used may be configured for each cell through the SIB instead of the PRB offset defined in Table 5.

When the scaling value to be multiplied by the PRB offset proposed in [Proposed Method #1] is X, an equation for calculating a starting PRB index may be represented as in Table 6 with respect to indexes 0 to 14 of Table 5.

TABLE 6

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
  - the UE determines the lowest PRB index of the PUCCH transmission in the first hop as $RB_{BWP}^{offset} \cdot X +$
    $(\lfloor r_{PUCCH}/N_{CS} \rfloor) \cdot N_{RB}$ and the lowest PRB index of the PUCCH transmission in the second hop as
    $N_{BWP}^{size} - RB_{BWP}^{offset} \cdot X - (1 + \lfloor r_{PUCCH}/N_{CS} \rfloor) \cdot N_{RB}$, where $N_{CS}$ is the total number of
    initial cyclic shift indexes in the set of initial cyclic shift indexes
  - the UE determines the initial cyclic shift index in the set of initial cyclic shift indexes as $r_{PUCCH} \bmod N_{CS}$
If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
  - the UE determines the lowest PRB index of the PUCCH transmission in the first hop as $N_{BWP}^{size} -$ TABLE 6-continued $RB_{BWP}^{offset} \cdot X - (1 + \lfloor (r_{PUCCH} - 8)/N_{CS} \rfloor) \cdot N_{RB}$ and the lowest PRB index of the PUCCH transmission
in the second hop as $RB_{BWP}^{offset} \cdot X + (\lfloor (r_{PUCCH} - 8)/N_{CS} \rfloor) \cdot N_{RB}$ If the PRB offset to be used instead of the PRB offset defined in Table 5 is configured through the SIB instead of the scaling value, the PRB offset configured through the SIB may be substituted for $RB_{BWP}^{offset}$ of Table 5, where X may be 1.

[Proposed Method #2]

While a starting PRB index of each PUCCH resource of a cell for which one of PUCCH resource sets corresponding to indexes 0 to 14 is configured among the initial PUCCH resource sets of Table 5 used before a dedicated PUCCH resource is configured uses an equation of multiplying $N_{RB}$ (or an additionally configured value) in a corresponding equation, a starting PRB index of a PUCCH resource of a cell for which a PUCCH resource set corresponding to index 15 is configured is calculated using the following methods.

1. Embodiment #2-1

$N_{RB}$ (or additionally configured value) may be multiplied by each term except for a term including $RB_{BWP}^{offset}$ in an equation of determining a starting PRB index. In other words, $N_{RB}$ (or additionally configured value) may be multiplied only by the remaining term(s) except for a term including $RB_{BWP}^{offset}$ in the equation of determining the starting PRB index. For example, according to Embodiment #2-1, the starting PRB index may be determined according to Table 8. In Table 8, $N_{RB}$ may be the number of RBs allocated for PUCCH transmission or may be an additionally configured value.

2. Embodiment #2-2

$N_{RB}$ (or additionally configured value) may be multiplied by each terms except for a term including $RB_{BWP}^{offset}$ in the equation of determining the starting PRB index. In addition, $\max\{RB_{BWP}^{offset}, N_{RB}\}$ may be used instead of $RB_{BWP}^{offset}$.

In other words, $N_{RB}$ (or additionally configured value) may be multiplied only by the remaining term(s) except for a term including $RB_{BWP}^{offset}$ in the equation of determining the starting PRB index. In addition, $\max\{RB_{BWP}^{offset}, N_{RB}\}$ may be substituted for $RB_{BWP}^{offset}$ in the term including $RB_{BWP}^{offset}$. For example, according to Embodiment #2-2, the starting PRB index may be determined according to Table 8 and, in Table 8, $RB_{BWP}^{offset}$ may be replaced with $\max\{RB_{BWP}^{offset}, N_{RB}\}$. In Table 8, $N_{RB}$ may be the number of RBs allocated for PUCCH transmission or may be an additionally configured value.

3. Embodiment #2-3

An initial PUCCH resource set of index 15 may not be used in a band of 60 GHz. Alternatively, the UE may not expect that the initial PUCCH resource set of index 15 will be used before a dedicated PUCCH resource set is configured through RRC in a band of 60 GHz.

4. Embodiment #2-4

If an $N_{RB}$ value (or additionally configured value) is equal to or less than a specific value, the initial PUCCH resource set corresponding to index 15 may be considered to be valid, so that the initial PUCCH resource set of index 15 may be used for PUCCH transmission. In contrast, if the $N_{RB}$ value (or additionally configured value) exceeds the specific value, the initial PUCCH resource set corresponding to index 15 may be considered to be invalid, so that the initial PUCCH resource set of index 15 may not be used for PUCCH transmission.

Here, the specific value may be a single value regardless of the size of a BWP (i.e., a prescheduled fixed value (in the standard document) or a value configured by the BS) or a value proportional to the BWP (e.g. BWP/4).

5. Embodiment #2-5

If the BWP is equal to or greater than the specific value, the initial PUCCH resource set corresponding to index 15 may be considered to be valid so that the initial PUCCH resource set of index 15 may be used for PUCCH transmission. In contrast, If the BWP is less than the specific value, the initial PUCCH resource set corresponding to index 15 may be considered to be invalid so that the initial PUCCH resource set of index 15 may not be used for PUCCH transmission.

Here, the specific value may be a single value regardless of a set $N_{RB}$ value (or an additionally configured value) (i.e., a prescheduled fixed value (in the standard document) or a value configured by the BS) or a value proportional to the set $N_{RB}$ value (or additionally configured value).

6. Embodiment #2-6

A scaling value to be multiplied by a PRB offset configured through the SIB may be multiplied by the PRB offset defined in Table 5 in the initial PUCCH resource sets of indexes 0 to 14 and a configured value may be applied as the PRB offset in the initial PUCCH resource set of index 15.

For example, if $N_{RB}$ is configured through the SIB, a final PRB offset may be determined by multiplying $N_{RB}$ by the PRB offset defined in Table 5 in the initial PUCCH resource sets of indexes 0 to 14 and the $N_{RB}$ value may be determined as the final PRB offset in the initial PUCCH resource set of index 15.

7. Embodiment #2-7

A PRB offset to be applied to each cell may be configured through the SIB separately from $N_{RB}$. In other words, in the initial PUCCH resource set of index 15, a separate PRB offset may be configured together with $N_{RB}$, and the separate PRB offset may be used instead of $\lfloor N_{BWP}^{size}/4 \rfloor$ which is a PRB offset of the initial PUCCH resource set of index 15.

In the above proposals, the additionally configured value of $N_{RB}$ may mean a configured value based on [Proposed Method #1].

As described above, the PRB offsets for respective indexes defined in Table 5 are values defined based on the case in which PUCCH resources in each initial PUCCH resource set use one RB, for FDM between adjacent cells. Therefore, when the PUCCH resources are configured in multiple RBs, the starting PRB index may be calculated by scaling of the PRB offset of each index defined in Table 5 based on the number of PRBs used for PUCCH transmission per cell.

For example, in an initial PUCCH resource set of index 1 and an initial PUCCH resource set of index 2, PRB offsets are defined as 0 and 3, respectively, for 2-cell FDM. That is, when Cell #1 and Cell #2, which are adjacent to each other, use the initial PUCCH resource set of index 1 and the initial PUCCH resource set of index 2, respectively, PRBs of PUCCH resources used in the respective cells are defined not to overlap.

If $N_{RB}$ values in Cell #1 and Cell #2 are set to 6 through the SIB, a PRB offset may be scaled using $N_{RB}$. For example, Cell #2 using the initial PUCCH resource set of index 2 determines the PRB offset as 18 (=3×6) to apply the determined PRB offset to the equation of calculating the starting PRB index.

The above-described method may be applied to a total of 15 initial PUCCH resource sets from index 0 to index 14 of Table 5, including the initial PUCCH resource set of index 1 and the initial PUCCH resource set of index 2.

However, as described above, since the initial PUCCH resource set of index 15 is an initial PUCCH resource set considering a special cell deployment situation, rather than FDM between adjacent cells, the starting PRB index may be calculated based on the methods of Embodiment #2-1 to Embodiment #2-7 different from initial PUCCH resource sets of indexes 0 to 14.

When the above description may be expressed as an equation. That is, for the initial PUCCH resource sets of indexes 0 to 14 of Table 5, the starting PRB index may be calculated by applying an equation of Table 7.

That is, for the initial PUCCH resource sets of indexes 0 to 14, the starting PRB index may be calculated by multiplying $N_{RB}$ including $RB_{BWP}^{offset}$ (e.g., a term including $RB_{BWP}^{offset}$) in the equation of determining the starting PRB index. Meanwhile, for the initial PUCCH resource set of index 15, the starting PRB index may be calculated by multiplying $N_{RB}$ by the remaining terms except for $RB_{BWP}^{offset}$ (e.g., a term including $RB_{BWP}^{offset}$) in the equation of determining the starting PRB index.

Figure 10:
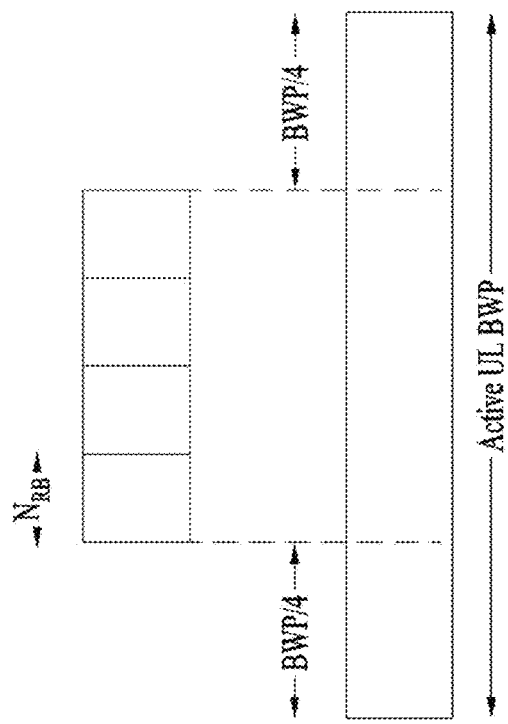
FIGS. 10 to 13 are diagrams for explaining an example of allocating a PUCCH resource when index #15 of an initial PUCCH resource set is configured.

FIG. 10 illustrates an example in which PUCCH resources are multiplexed through FDM based on a PRB offset of an initial PUCCH resource set of index 15.

As may be appreciated from FIG. 10, for the initial PUCCH resource set of index 15, PRBs separated by a PRB offset of BWP/4 RBs (specifically, $\lfloor N_{BWP}^{size}/4 \rfloor$) from a low frequency PRB and a high frequency PRB of a BEW may be used as PUCCH resources.

When the number of "set of initial CS indexes" has 4 elements (e.g., initial PUCCH resource sets of indexes 4, 5, 6, 8, 9, 10, 12, 13, 14, and 15), a total of 4 PRBs is needed. Therefore, when the number of RBs per PUCCH resource is $N_{RB}$, 4 PUCCH resources including $N_{RB}$ may be considered. Therefore, a method using $\max\{RB_{BWP}^{offset}, N_{RB}\}$ instead of $RB_{BWP}^{offset}$ may be considered. For example, as may be appreciated from FIG. 12, when a plurality of RBs is used for PUCCH transmission, PUCCH resources may overlap. If the PUCCH resources overlap, overlapping PUCCH resources among PUCCH resources included in an initial PUCCH resource set may not be used.

However, if an offset is equal to or greater than a certain value, overlapping PUCCH resources may not be present even though the PUCCH resources are not suitable for design of the initial PUCCH resource set as may be appre-

TABLE 7

Figure 13:
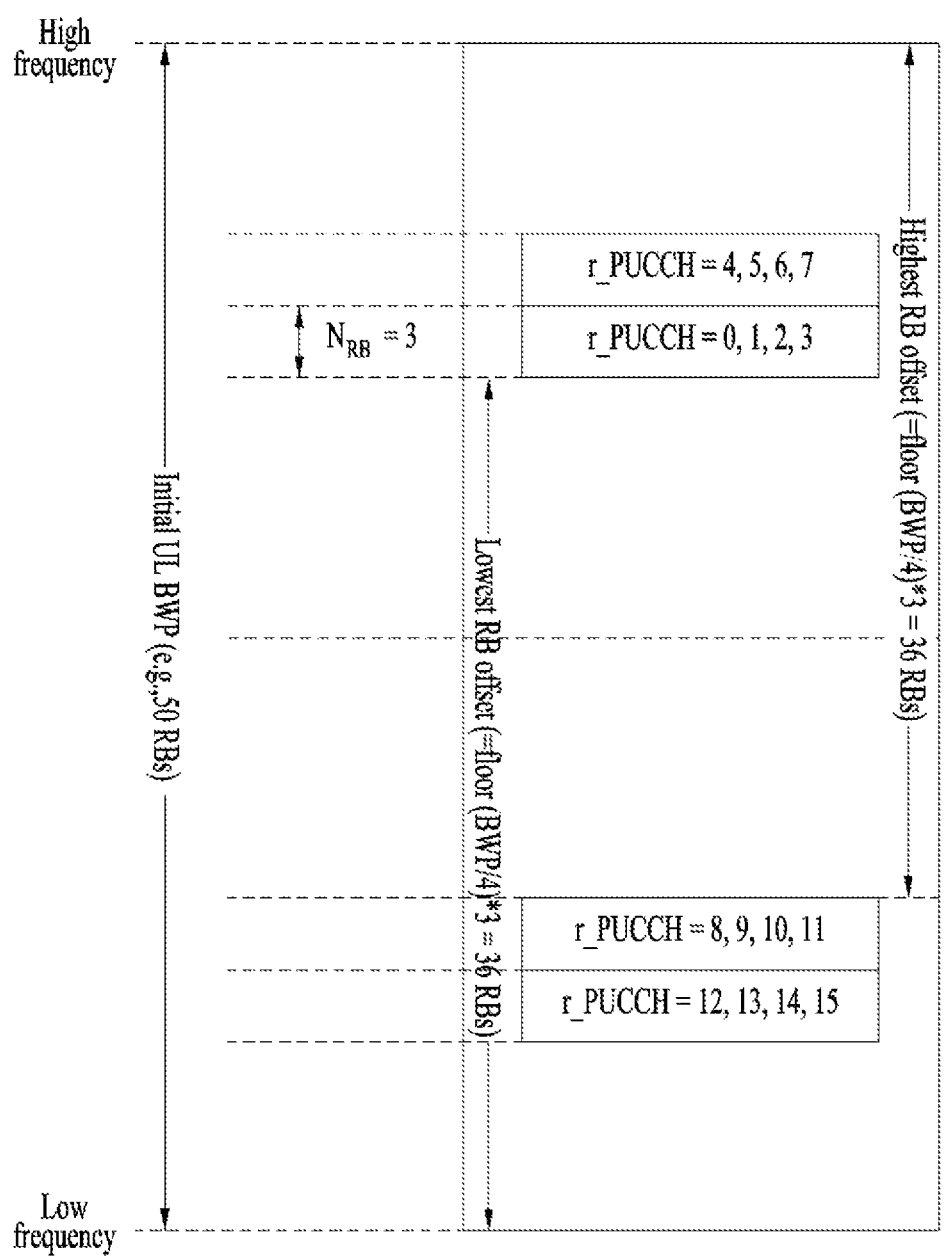

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $(RB_{BWP}^{offset} + \lfloor r_{PUCCH}/N_{CS} \rfloor) \cdot N_{RB}$ and the lowest PRB index of the PUCCH transmission in the second hop as $N_{BWP}^{size} - (1 + RB_{BWP}^{offset} + \lfloor r_{PUCCH}/N_{CS} \rfloor) \cdot N_{RB}$, where $N_{CS}$ is the total number of initial cyclic shift indexes in the set of initial cyclic shift indexes
- the UE determines the initial cyclic shift index in the set of initial cyclic shift indexes as $r_{PUCCH} \bmod N_{CS}$
If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $N_{BWP}^{size} - (1 + RB_{BWP}^{offset} + \lfloor (r_{PUCCH} - 8)/N_{CS} \rfloor) \cdot N_{RB}$ and the lowest PRB index of the PUCCH transmission in the second hop as $(RB_{BWP}^{offset} + \lfloor (r_{PUCCH} - 8)/N_{CS} \rfloor) \cdot N_{RB}$ Meanwhile, for the initial PUCCH resource set of index 15, the starting PRB index may be calculated by applying an equation of Table 8.

ciated from FIG. 13. In this case, all PUCCH resources may be used. Therefore, $\max\{RB_{BWP}^{offset}, N_{RB}\}$ may be considered instead of $RB_{BWP}^{offset}$ that a method of maximally using

TABLE 8

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $RB_{BWP}^{offset} + (\lfloor r_{PUCCH}/N_{CS} \rfloor) \cdot N_{RB}$ and the lowest PRB index of the PUCCH transmission in the second hop as $N_{BWP}^{size} - RB_{BWP}^{offset} - (1 + \lfloor r_{PUCCH}/N_{CS} \rfloor) \cdot N_{RB}$, where $N_{CS}$ is the total number of initial cyclic shift indexes in the set of initial cyclic shift indexes
- the UE determines the initial cyclic shift index in the set of initial cyclic shift indexes as $r_{PUCCH} \bmod N_{CS}$
If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $N_{BWP}^{size} - RB_{BWP}^{offset} - (1 + \lfloor (r_{PUCCH} - 8)/N_{CS} \rfloor) \cdot N_{RB}$ and the lowest PRB index of the PUCCH transmission in the second hop as $RB_{BWP}^{offset} + (\lfloor (r_{PUCCH} - 8)/N_{CS} \rfloor) \cdot N_{RB}$
- the UE determines the initial cyclic shift index in the set of initial cyclic shift indexes as $(r_{PUCCH} - 8) \bmod N_{CS}$ PUCCH resources may be considered by designing PUCCH resources such that there are not as few overlapping PUCCH resources as possible.

Alternatively, in order to minimize specification impact, only 15 initial PUCCH resource sets of indexes 0 to 4 may be used except for an initial PUCCH resource set of index 15 in initial PUCCH resource sets of a band of 60 GHz.

As may be appreciated from FIG. 10, in the initial PUCCH resource set of index 15, since a PRB offset of BWP/4 should be applied to an upper side and a lower side of a BWP, the $N_{RB}$ value should not be greater than ⅛ of the BWP. Accordingly, the initial PUCCH resource set of index 15 may be considered to be invalid according to the $N_{RB}$ value which is configured in consideration of the number of available RBs of an initial BWP (e.g., 68 based on an SCS of 120/480 kHz) and in consideration of the initial PUCCH resource set of index 15 and the UE may not use the initial PUCCH resource set of index 15.

For example, if the configured $N_{RB}$ value is equal to or less than a specific value or equal to or greater than the specific value, the initial PUCCH resource set of index 15 may be considered to be valid, so that the initial PUCCH resource set of index 15 may be used for PUCCH transmission. In contrast, if the configured $N_{RB}$ value exceeds the specific value or is less than the specific value, the initial PUCCH resource set of index 15 may be considered to be invalid, so that the initial PUCCH resource set of index 15 may not be used for PUCCH transmission. The specific value may be a single value regardless of the size of the BWP or a value proportional to the BWP (e.g. BWP/4). In addition, the specific value may be a value calculated by a prescheduled method or defined in the standard or may be a preset value.

If the scaling value to be multiplied by the PRB offset is configured through the SIB, the scaling value to be multiplied by the PRB offset may be multiplied by the PRB offset defined in Table 5 in the initial PUCCH resource sets of indexes 0 to 14 and the configured scaling value may be applied as the PRB offset in the initial PUCCH resource set of index 15. Alternatively, a PRB offset to be applied to each cell may be configured separately from $N_{RB}$ through the SIB.

When the scaling value to be multiplied by the PRB offset is configured for each cell as in [Proposed Method #1], the starting PRB index may be calculated by multiplying the scaling value configured for each cell by the PRB offset defined in Table 5 with respect to all indexes 0 to 15. Alternatively, the configured scaling value may be applied as the PRB offset only in the case of the initial PUCCH resource set of index 15.

[Proposed Method #3]

Method of configuring a PUCCH resource and calculating a PRB index as follows when the BS configures $N_{RB}$, which is the number of RBs for PUCCH transmission, through the SIB for the UE

1. Embodiment #3-1

When $N_{RB}$ indicated through the SIB is equal to or greater than a specific value, the UE may not expect that the initial PUCCH resource set of index 15 of Table 5 is indicated as an initial (common) PUCCH resource set.

For example, when the initial PUCCH resource set of index 15 is indicated, only 1, 2, or 3 may be used as the $N_{RB}$ value.

2. Embodiment #3-2

When $N_{RB}$ is equal to or less than Y, if the initial PUCCH resource set of index 15 of Table 15 is indicated by the initial (common) PUCCH resource set, a PRB index may be calculated by scaling the PRB offset by $X=N_{RB}$ in Table 9. When $N_{RB}$ exceeds Y, a PRB index for a PUCCH resource may be calculated by applying [Proposed Method #2] or whether the initial PUCCH resource set of index 15 is valid may be determined.

TABLE 9

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $RB_{BWP}^{offset} \cdot X + (\lfloor r_{PUCCH}/N_{CS} \rfloor) \cdot N_{RB}$ and the lowest PRB index of the PUCCH transmission in the second hop as $N_{BWP}^{size} - RB_{BWP}^{offset} \cdot X - (1 + \lfloor r_{PUCCH}/N_{CS} \rfloor) \cdot N_{RB}$, where $N_{CS}$ is the total number of initial cyclic shift indexes in the set of initial cyclic shift indexes
- the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
1. - the UE determines the lowest PRB index of the PUCCH transmission in the first hop as $N_{BWP}^{size} - RB_{BWP}^{offset} \cdot X - (1 + \lfloor (r_{PUCCH} - 8)/N_{CS} \rfloor) \cdot N_{RB}$ and the lowest PRB index of the PUCCH transmission in the second hop as $RB_{BWP}^{offset} \cdot X + (\lfloor (r_{PUCCH} - 8)/N_{CS} \rfloor) \cdot N_{RB}$ As described above, the initial PUCCH resource set of index 15 among the initial (common) PUCCH resource sets of Table 5 used before the dedicated PUCCH resource is configured is an initial PUCCH resource set considering special cell deployment rather than FDM between adjacent cells. Accordingly, the PRB offset of the initial PUCCH resource set of index 15 is defined as a value (i.e., $\lfloor N_{BWP}^{size}/4 \rfloor$) obtained by taking floor after dividing the initial BWP size by ¼, which is different from initial PUCCH resource sets of other indexes.

Therefore, when PUCCH formats 0/1 transmitted on a common PUCCH resource in a band of 60 GHz are transmitted through a plurality of RBs according to the $N_{RB}$ value indicated through the SIB, rather than through a single RB, if the PRB offset of the initial PUCCH resource of index 15 is simply scaled based on $N_{RB}$ like the PRB offsets of the initial PUCCH resource sets of indexes 0 to 14, a PUCCH resource allocated to an RB out of an initial BWP may occur according to a calculation result of the PRB index in a specific $N_{RB}$ value.

Figure 11:
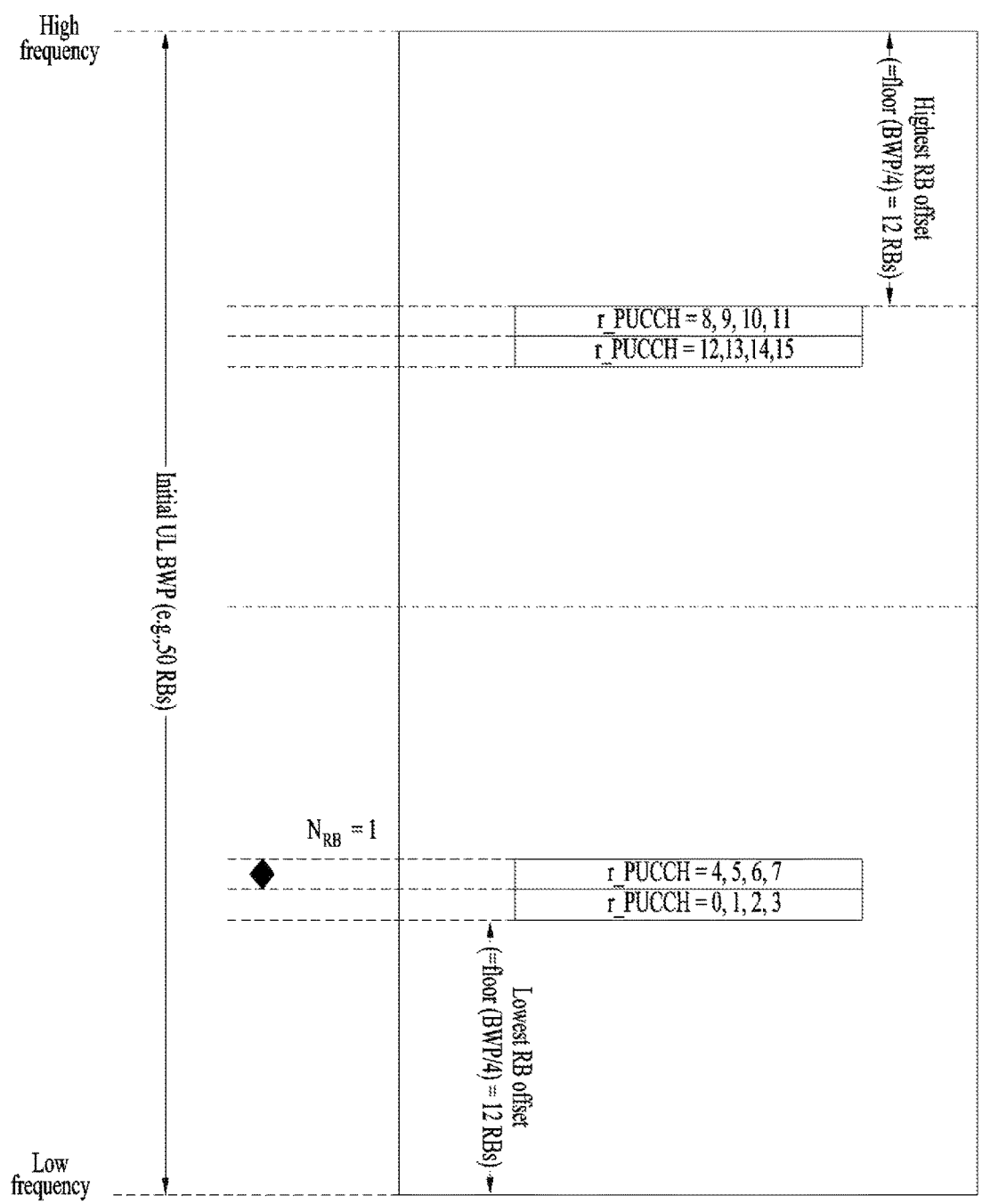

For example, when the number of available RBs of the initial BWP is 50 and the $N_{RB}$ value is 1 (i.e., when a PUCCH is transmitted in a single RB in the same manner as legacy transmission), 16 PUCCH resources may be allocated as illustrated in FIG. 11 as a result of calculating PRB indexes according to an equation of 3GPP TS 38.213 9.2.1.

Here, r_PUCCH means indexes of 16 PUCCH resources having a range of $0 \leq r_{PUCCH} \leq 15$. The lowest PRB index and the highest PRB index may be calculated based on $\lfloor N_{BWP}^{size}/4 \rfloor$, which is a PRB offset, to allocate PUCCH resources. The 16 PUCCH resources are PUCCH resources included in one initial PUCCH resource set (e.g., the initial PUCCH resource set of index 15).

Figure 12:
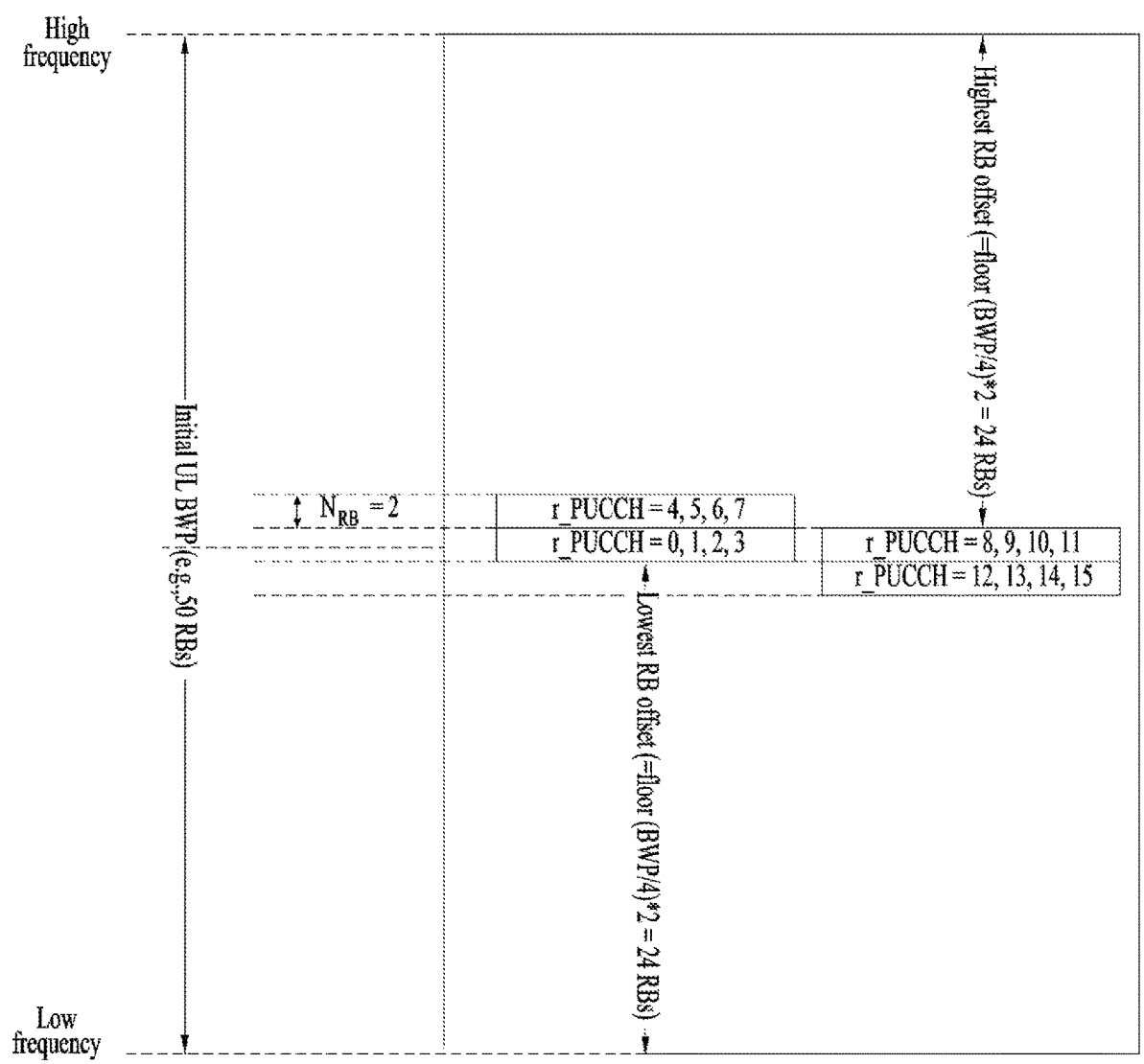

However, when $N_{RB}$ is larger than 1, the PUCCH resources may be allocated in a form different from that in FIG. 11. FIG. 12 illustrates an example of allocating PUCCH resources when $N_{RB}=2$. For example, as in initial PUCCH resource sets of indexes 0 to 14 defined in 3GPP TS 38.213 Table 9.2.1-1, a PRB index of an initial PUCCH resource set of index 15 calculated by scaling a PRB offset of the initial PUCCH resource set of index 15 according to Table 10 by $N_{RB}$ may be represented as in FIG. 12.

Alternatively, when the $N_{RB}$ value is less than or equal to Y (e.g., Y=1 or 3) and the initial (common) PUCCH resource set is indicated by the initial PUCCH resource set of index 15 in Table 5, a PRB index may be calculated by scaling the PRB offset by $X=N_{RB}$ in Table 11. In addition, if the $N_{RB}$ value exceeds Y (e.g., Y=1 or 3), the PRB index for PUCCH resources may be calculated by applying [Proposed Method #2] or whether the initial PUCCH resource set of index 15 is valid may be determined.

TABLE 10

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $(RB_{BWP}^{offset} + \lfloor r_{PUCCH}/N_{CS} \rfloor) \cdot N_{RB}$ and the lowest PRB index of the PUCCH transmission in the second hop as $N_{BWP}^{size} - (1 + RB_{BWP}^{offset} + \lfloor r_{PUCCH}/N_{CS} \rfloor) \cdot N_{RB}$, where $N_{CS}$ is the total number of initial cyclic shift indexes in the set of initial cyclic shift indexes
- the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $N_{BWP}^{size} - (1 + RB_{BWP}^{offset} + \lfloor (r_{PUCCH} - 8)/N_{CS} \rfloor) \cdot N_{RB}$ and the lowest PRB index of the PUCCH transmission in the second hop as $(RB_{BWP}^{offset} + \lfloor (r_{PUCCH} - 8)/N_{CS} \rfloor) \cdot N_{RB}$ As may be appreciated from FIG. 12, overlap occurs between PUCCH resources of the initial PUCCH resource set of index 15 (i.e., overlap between r_PUCCH=0, 1, 2, 3 and r_PUCCH=8, 9, 10, 11), so that 16 resources may not be simultaneously used and 8 resources of indexes 0 to 7 or 8 resources of indexes 8 to 15 may be used as valid resources.

TABLE 11

If $\lfloor r_{PUCCH}/8 \rfloor = 0$ and a UE is provided a PUCCH resource by pucch-ResourceCommon and is not provided useInterlacePUCCH-PUSCH in BWP-UplinkCommon
- the UE determines the lowest PRB index of the PUCCH transmission in the first hop as $RB_{BWP}^{offset} \cdot X + (\lfloor r_{PUCCH}/N_{CS} \rfloor) \cdot N_{RB}$ and the lowest PRB index of the PUCCH transmission in the second hop as $N_{BWP}^{size} - RB_{BWP}^{offset} \cdot X - (1 + \lfloor r_{PUCCH}/N_{CS} \rfloor) \cdot N_{RB}$, where $N_{CS}$ is the total number of initial cyclic shift indexes in the set of initial cyclic shift indexes
- the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUSCH in BWP-UplinkCommon
2. - the UE determines the lowest PRB index of the PUCCH transmission in the first hop as $N_{BWP}^{size} - RB_{BWP}^{offset} \cdot X - (1 + \lfloor (r_{PUCCH} - 8)/N_{CS} \rfloor) \cdot N_{RB}$ and the lowest PRB index of the PUCCH transmission in the second hop as $RB_{BWP}^{offset} \cdot X + (\lfloor (r_{PUCCH} - 8)/N_{CS} \rfloor) \cdot N_{RB}$ When $N_{RB}$ is 3, an example of allocating PUCCH resources by calculating a PRB index of the initial PUCCH resource set of index 15 according to an equation of Table 10 is as illustrated in FIG. 13.

As may be appreciated from FIG. 13, although 16 PUCCH resources may be allocated, PUCCH resources are allocated even to a region of a PRB offset differently from the original intention.

Therefore, when $N_{RB}$ indicated through the SIB is equal to or greater than a specific value (e.g., 2 or 4), the UE may not expect that the initial PUCCH resource set of index 15 in Table 5 is indicated as the initial (common) PUCCH resource set. For example, when the initial PUCCH resource set of index 15 is indicated, only 1/2/3 may be limitedly used as $N_{RB}$. In other words, only when the $N_{RB}$ value indicated through the SIB is 3 or less, the UE may consider that the initial PUCCH resource set of index 15 in Table 5 is valid. As another example, only when $N_{RB}$ is 1, the initial PUCCH resource set of index 15 may be considered to be valid, and the corresponding initial PUCCH resource set may be considered to be used. That is, the initial PUCCH resource set of index 15 is used only when a PUCCH is transmitted only in a single RB as in legacy transmission. In other words, only when the $N_{RB}$ value indicated through the SIB is 1, the UE may consider that the initial PUCCH resource set of index 15 in Table 5 is valid.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
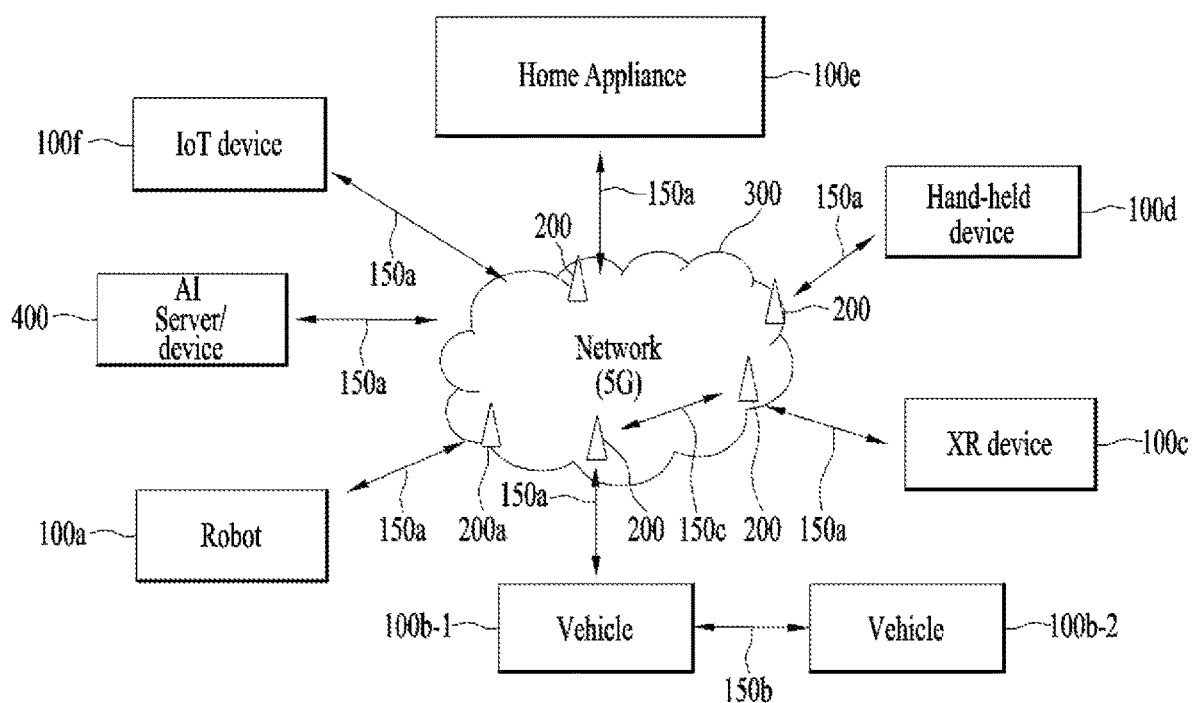
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul(IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
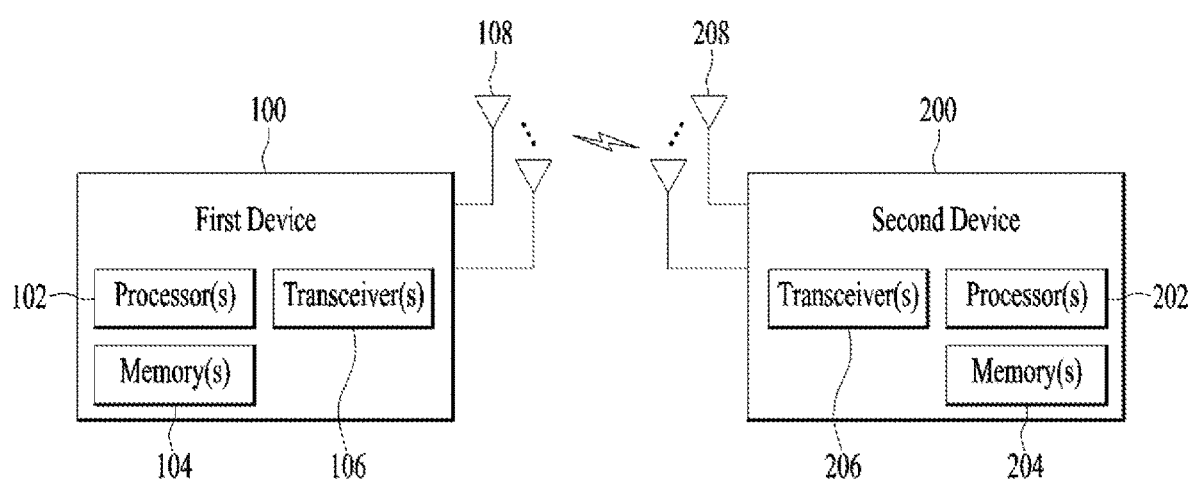
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will now be described.

Although the following operations will be described based on a control operation of the processor 102 in terms of the processor 102, software code for performing such an operation may be stored in the memory 104. For example, in the present disclosure, the at least one memory 104 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor 102 may receive at least one of first information related to an index of an initial PUCCH resource set, second information related to the number of PRBs for PUCCH transmission, and third information related to a PRB offset through the transceiver 106. Which information among the first to third information is received may be based on at least one of [Proposed Method #1] to [Proposed Method #3]. For example, the first information and the second information may be necessarily received according to [Proposed Method #1] to [Proposed Method #3], and the third information may be received only when the PRB offset is scaled separately from the second information or a new PRB offset is configured, based on at least one of [Proposed Method #1] to [Proposed Method #3].

The first information to the third information may be received through an RRC layer.

The processor 102 may receive fourth information related to a PUCCH resource included in a PUCCH resource set corresponding to the first information through the transceiver 106. For example, the fourth information may be information for determining an index of the PUCCH resource included in the corresponding PUCCH resource set and may be received through DCI.

The processor 102 may determine a PUCCH resource for PUCCH transmission based on the first to fourth information. The processor 102 may transmit a PUCCH through the determined PUCCH resource through the transceiver 106. The processor may determine the PUCCH resource and transmit the PUCCH based on at least one of [Proposed Method #1] to [Proposed Method #3].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

For example, the processor 202 may transmit at least one of first information related to an index of an initial PUCCH resource set, second information related to the number of PRBs for PUCCH transmission, and third information related to a PRB offset through the transceiver 206. Which information among the first to third information is transmitted may be based on at least one of [Proposed Method #1] to [Proposed Method #3]. For example, the first information and the second information may be necessarily transmitted according to [Proposed Method #1] to [Proposed Method #3], and the third information may be transmitted only when the PRB offset is scaled separately from the second information or a new PRB offset is configured, based on at least one of [Proposed Method #1] to [Proposed Method #3].

The first to third information may be transmitted through an RRC layer.

The processor 202 may transmit fourth information related to a PUCCH resource included in a PUCCH resource set corresponding to the first information through the transceiver 206. For example, the fourth information may be information for determining an index of the PUCCH resource included in the corresponding PUCCH resource set and may be transmitted through DCI.

The processor 202 may receive a PUCCH through a PUCCH resource determined based on the first information to fourth information through the transceiver 206. The processor may receive the PUCCH based on at least one of [Proposed Method #1] to [Proposed Method #3].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
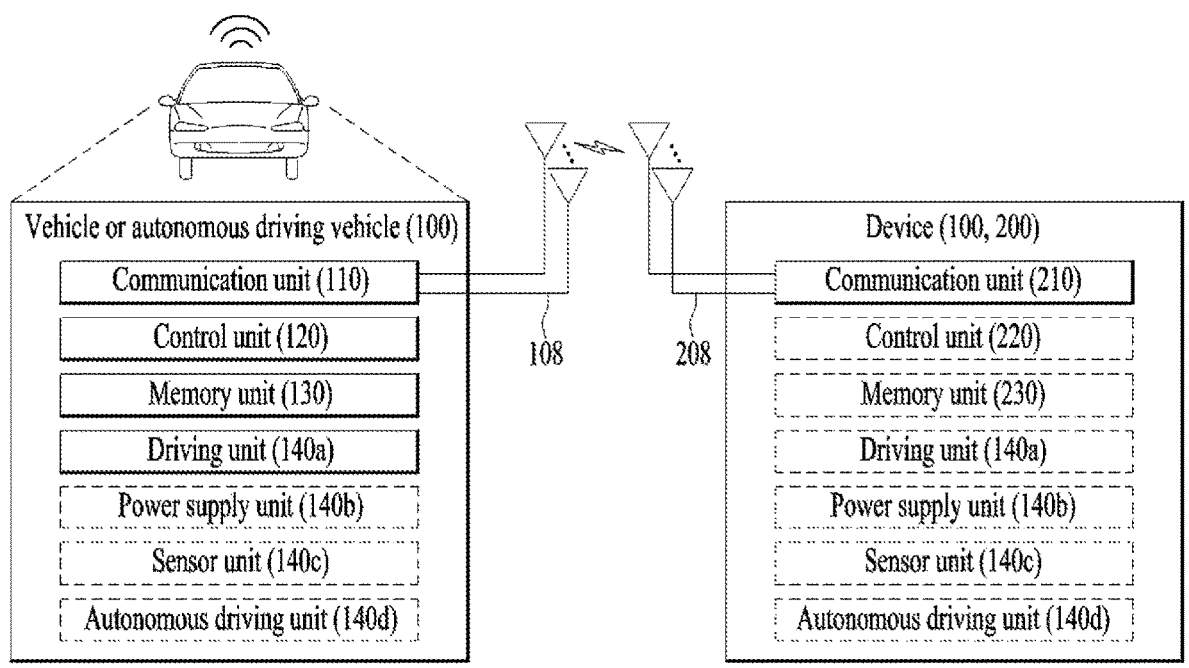
FIG. 16 illustrates an exemplary vehicle or autonomous driving vehicle applicable to the present disclosure.

FIG. 16 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNB s and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of transmitting and receiving a UL control channel and the apparatus therefor have been described based on an example applied to a 5G NR system, the method and apparatus are applicable to various wireless communication systems in addition to the 5G NR system.

What is claimed is:

1. A method of transmitting a physical uplink control channel (PUCCH) by a user equipment (UE) in a wireless communication system, the method comprising:
    receiving (i) first information related to an uplink (UL) bandwidth part (BWP), (ii) second information related to a number of resource blocks (RBs) for the PUCCH, and (iii) third information related to an index of one initial PUCCH resource set among a plurality of initial PUCCH resource sets;
    determining whether the one initial PUCCH resource set is valid based on at least of a size of the UL BWP and the number of the RBs; and
    transmitting the PUCCH through a PUCCH resource included in the one initial PUCCH resource set based on the one initial PUCCH resource set being valid,
    wherein the one initial PUCCH resource set is valid based on the number of RBs being equal to or less than a specific value,
    wherein the specific value is proportional to the size of the UL BWP.

2. The method of claim 1, wherein the index of the one initial PUCCH resource set is 15.

3. The method of claim 1, wherein the one initial PUCCH resource set is valid based on the size of the UL BWP being equal to or greater than a specific value.

4. The method of claim 3, wherein the specific value is proportional to the number of the RBs.

5. A user equipment (UE) for transmitting a physical uplink control channel (PUCCH) in a wireless communication system, the UE comprising:
    at least one transceiver;
    at least one processor; and
    at least one memory operably connected to the at least one processor and configured to store instructions causing, when executed, the at least one processor to perform operations comprising:
    receiving, through the at least one transceiver, (i) first information related to an uplink (UL) bandwidth part (BWP), (ii) second information related to a number of resource blocks (RBs) for the PUCCH, and (iii) third information related to an index of one initial PUCCH resource set among a plurality of initial PUCCH resource sets;
    determining whether the one initial PUCCH resource set is valid based on at least of a size of the UL BWP and the number of the RBs; and
    transmitting, through at least one transceiver, the PUCCH through a PUCCH resource included in the one initial PUCCH resource set based on the one initial PUCCH resource set being valid,
    wherein the one initial PUCCH resource set is valid based on the number of RBs being equal to or less than a specific value,
    wherein the specific value is proportional to the size of the UL BWP.

6. The UE of claim 5, wherein the index of the one initial PUCCH resource set is 15.

7. The UE of claim 5, wherein the one initial PUCCH resource set is valid based on the size of the UL BWP being equal to or greater than a specific value.

8. The UE of claim 7, wherein the specific value is proportional to the number of the RBs.

9. An apparatus for transmitting a physical uplink control channel (PUCCH) in a wireless communication system, the apparatus comprising:
    at least one processor; and
    at least one memory operably connected to the at least one processor and configured to store instructions causing, when executed, the at least one processor to perform operations comprising:
    receiving (i) first information related to an uplink (UL) bandwidth part (BWP), (ii) second information related to a number of resource blocks (RBs) for the PUCCH, and (iii) third information related to an index of one initial PUCCH resource set among a plurality of initial PUCCH resource sets;
    determining whether the one initial PUCCH resource set is valid based on at least of a size of the UL BWP and the number of the RBs; and
    transmitting the PUCCH through a PUCCH resource included in the one initial PUCCH resource set based on the one initial PUCCH resource set being valid,
    wherein the one initial PUCCH resource set is valid based on the number of RBs being equal to or less than a specific value,
    wherein the specific value is proportional to the size of the UL BWP.

* * * * *